3,112,311
2-PHENYL-5,6-DIMETHYL-MORPHOLINES AND 2-PHENYL - 5,6 - TETRAMETHYLENE - MORPHOLINES
Markus Zimmermann, Riehen, near Basel, and Franz Häfliger, Basel, Switzerland, assignors to Geigy Chemical Corporation, Ardsley, N.Y., a corporation of Delaware
No Drawing. Filed June 20, 1960, Ser. No. 37,077
Claims priority, application Switzerland Apr. 5, 1957
6 Claims. (Cl. 260—247)

This application is a continuation-in-part of copending application Ser. No. 723,093, filed March 24, 1958 (abandoned since the filing of the present application).

The present invention concerns new morpholine compounds which have valuable pharmacological properties.

It has surprisingly been found that morpholine compounds of the general formula:

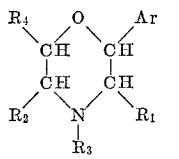

(I)

wherein

Ar represents a member selected from the group consisting of the phenyl radical, the hydroxyphenyl radical and the methoxyphenyl radical, $R_1$ represents a member selected from the group consisting of hydrogen and the methyl radical, $R_2$ alone represents the methyl radical, $R_3$ represents a member selected from the group consisting of hydrogen and an alkyl radical with 1–4 carbon atoms, $R_4$ alone represents the methyl radical, and $R_2$ and $R_4$ together represent the tetramethylene radical, have valuable neurophysiological properties. In particular they stimulate the central nervous system without increasing blood pressure at the same time. On the contrary, they cause a considerable reduction in the blood pressure. In addition the compounds defined above, particularly when they contain a hydroxyphenyl radical as Ar, are valuable intermediate products for the production of other substances having a neurophysiological action.

With regard to their neurophysiological properties, of the compounds of general Formula I, those wherein $R_3$ is represented by hydrogen, and of these particularly those wherein $R_2$ and $R_4$ are methyl groups, are especially valuable. As radical $R_1$, hydrogen is preferred to the methyl group.

As central stimulating agent, for example as appetite suppressant per os, a compound of the present invention can be given in daily doses of 20–150 mg. for adults, for example 2-phenyl-5,6-dimethyl-morpholine can be administered in dosages of 20–120 mg.

The compounds defined above can be produced in a simple manner by treating a compound of the general formula:

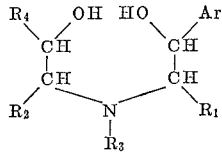

(II)

wherein Ar, $R_1$, $R_2$, $R_3$ and $R_4$ have the meanings given above, with an agent which splits off water. Mineral acids for example, such as concentrated sulphuric acid or 48% hydrobromic acid are suitable as such agents. The ring is closed in sulphuric acid already in the cold; if hydrobromic acid is used the reaction mixture must be heated. If a hydroxyl group is contained in Ar, the ring can be closed under considerably milder conditions, for example by dissolving hydrohalides of such compounds of the general Formula II in alcohol and leaving the solution to stand or gently heating it. In this case therefore, one mol of hydrogen halide, i.e. the hydrogen halide bound in the hydrohalide is sufficient as agent splitting off water.

Compounds of the general Formula II can be obtained for example by reacting a hydroxy amine of the general formula

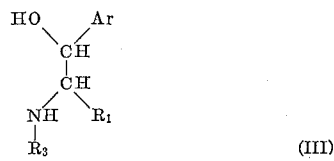

(III)

with an oxirane of the general formula:

(IV)

wherein Ar, $R_1$, $R_2$, $R_3$ and $R_4$ have the meanings given above. The crude products so obtained can be used direct for ring closure. The reactions can be performed in the presence or, what is generally more advantageous, in the absence of inert organic solvents at room temperature or in the warm; in the latter case low boiling oxiranes are reacted in a closed vessel. If the stereoisomeric starting materials differ only in the configuration at the carbon atom having the hydroxyl group they can produce identical end products so that if desired racemates of such starting materials can be used instead of the optically pure compounds as starting materials.

Examples of suitable starting materials of the general Formula III are 1-phenyl-2-amino-ethanol, 1-phenyl-2-amino-propanol, 1-phenyl-2-methylamino-propanol, in particular L-ephedrine, 1-(p-methoxyphenyl)-2-methyl-amino-propanol and 1-(p-hydroxyphenyl)-2-methylamino-ethanol, 1-(m.p-dihydroxyphenyl)-2-methylamino-ethanol, 1-(p - hydroxyphenyl) - 2 - n - butylamino - ethanol, 1-(m.p-dihydroxyphenyl)-2-amino-propanol and 1-(m.p-dihydroxyphenyl)-2-methylamino-propanol. These hydroxyamines are reacted with 2,3-epoxy-butane or with cyclohexene oxide.

Also by means of an analogous reaction, starting materials of the general Formula II are obtained by reacting a hydroxyamine of the general formula:

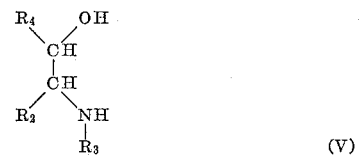

(V)

with an oxirane of the general formula:

(VI)

wherein Ar, $R_1$, $R_2$, $R_3$ and $R_4$ have the meanings given above. In this case too the crude products can be used direct for ring closure. Suitable hydroxyamines in this case are, for example 2-amino-3-hydroxy-butane, 2-methylamino-3-hydroxy-butane, 2-amino-cyclohexanol or 2-methylamino-cyclohexanol, all of which are reacted for example with styrene oxide, p-methoxy-styrene oxide, or trans-β-methyl styrene oxide.

Starting materials of the general Formula II are also obtained if, instead of the oxiranes of the general Formula IV or VI, corresponding halogen hydrins are reacted with hydroxyamines of the general Formula III or V.

Finally, compounds of the general Formula I, in which $R_3$ is an alkyl radical with 1–4 carbon atoms, are obtained by reacting morpholine compounds of the general formula:

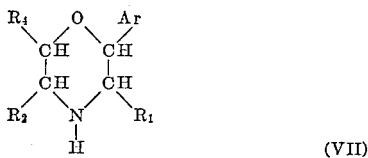

(VII)

wherein Ar, $R_1$, $R_2$ and $R_4$ have the meanings given above, with suitable alkylating or alkenylating agents such as e.g. low molecular alkyl or alkenyl halides, aryl sulphonic acid alkyl esters, dialkyl sulphates or with formaldehyde in the presence of formic acid. The compounds of the general Formula VII can be obtained by the first two processes above mentioned on using hydroxyamines of the general Formula III or V having a primary amino group.

The morpholine compounds of the general Formula I form salts with inorganic and organic acids such as, for example, hydrochloric acid, hydrobromic acid, sulphuric acid, phosphoric acid, tartaric acid and citric acid. Some of these salts are soluble in water.

The following examples further illustrate the production of the new morpholine compounds. Parts are given as parts by weight and their relationship to parts by volume is as that of grammes to cubic centimetres. The temperatures are in degrees centigrade.

*Example 1*

9.8 parts of cyclohexene oxide, 16.5 parts of L-ephedrine and about 0.5 part of water are heated for 3 hours at 150°. After cooling, the reaction mixture is dissolved in 200 parts by volume of ether and a solution of 9.8 parts of concentrated sulphuric acid in 100 parts by volume of ether is added at 0°. The ether is then distilled off and the residue is mixed at 0° with 100 parts of concentrated sulphuric acid. The solution obtained is stored for about 14 hours at room temperature and then poured onto ice; after shaking once with ether, the acid aqueous solution is made alkaline with sodium hydroxide solution. It is then extracted with ether, the ethereal solution is dried with potassium carbonatae and the ether is distilled off. On distilling the residue in a high vacuum, 2-phenyl-3,4-dimethyl-5,6-tetramethylene morpholine is obtained, $B_{.0.02}$ 91–93°.

*Example 2*

48 parts of styrene oxide, 35.6 parts of 1,2-dimethylethanol-amine and 2 parts of water are heated first for 3 hours at 40–50° and then for 15 hours at 80–90°. The N-(3-hydroxybutyl-2)-N-(2-hydroxy-2-phenylethyl)-amine obtained passes over at 106° under 0.0002 mm. pressure.

40 parts of this compound are dissolved in 200 parts by volume of concentrated sulphuric acid at room temperature with occasional cooling and the solution is then left to stand for 24 hours at room temperature. It is then poured into ice water, the reaction is made strongly alkaline with sodium hydroxide and the whole is extracted with ether. The 2-phenyl-5,6-dimethyl-morpholine obtained boils at 68° under 0.0007 mm. pressure.

*Example 3*

7.6 parts of 2-phenyl-5,6-dimethyl-morpholine, obtained according to Example 2, 90 parts by volume of n-butyl alcohol, 5.5 parts of butyl bromide and 6.9 parts of pulverised dry potassium carbonate are stirred for 24 hours at 80–90°. After concentrating the reaction mixture in the vacuum, the residue is dissolved in water and the solution is extracted with ether. The ether extract is distilled through a short Vigreux column and 2-phenyl-4-n-butyl-5,6-dimethyl-morpholine is obtained, $B_{.0.001}$ 81–82°.

*Example 4*

9.5 parts of 2-phenyl-5,6-dimethyl morpholine are dissolved while cooling in 11.5 parts of 100% formic acid, 10 parts by volume of a 37% aqueous formaldehyde solution are added and the whole is heated for 10 hours at a bath temperature of 90–100°. The solvents are then distilled off in vacuo, saturated sodium carbonate solution is added to the residue and this is extracted three times with ether. The ethereal solution is dried with sodium carbonate, evaporated to dryness, and the residue is distilled in a high vacuum whereupon 2-phenyl-4,5,6-trimethylmorpholine is obtained; $B_{.0.0007}$ 56–57°.

*Example 5*

11.9 parts of cyclohexene oxide, 18.1 parts of 1-phenyl-2-aminopropanol and about 0.2 part of water are heated for several hours at 150° and the reaction mixture is worked up as described in Example 1. The diol so obtained is converted with 100 parts of concentrated sulphuric acid, also analogously to Example 1, into 2-phenyl-3-methyl-5,6-tetramethylene morpholine, $B_{.0.005}$ 93–95°.

Also analogously to Example 1, 2-phenyl-5,6-tetramethylene morpholine is obtained from 30.1 parts of 1-phenyl-2-aminoethanol, 21.8 parts of cyclohexene oxide and about 0.3 part of water. The crude product is purified by distillation in the high vacuum at a bath temperature of 130–140° under 0.1 mm. pressure.

*Example 6*

5 parts of 1-(p-hydroxyphenyl)-2-methylamino-ethanol are dissolved in the warm in 30 parts by volume of dimethyl formamide. The solution is heated for 20 hours at 100–110° with 3 parts of cyclohexene oxide and about 0.1 part of water. The reaction mixture is then evaporated to dryness in vacuo. The residue is dissolved in 30 parts by volume of isopropanol saturated with hydrogen chloride and the solution is evaporated to dryness on a water bath. 2(p-hydroxyphenyl)-4-methyl-5,6-tetramethylene morpholine is liberated with excess potassium carbonate from the remaining hydrochloride. After crystallisation from methanol/acetone/petroleum ether, it melts at 223–225°. After sublimation, the melting point rises to 228–229°.

*Example 7*

10.5 parts of p-methoxystyrene oxide, 12.5 parts of 2-amino-3-hydroxybutane and 10 parts by volume of ethanol are heated while stirring first for 10 hours on a bath of 50° and then for 5 hours on a bath of 100°. On distilling the reaction mixture, N-(3-hydroxybutyl-2)-N-(2-hydroxy-2-phenylethyl)-amine is obtained, $B_{.0.0001}$ 136–137°.

To close the ring, for example, 3 parts of the above diol are heated with 30 parts by volume of 70% sulphuric acid for 1 hour at 50–60°. The base is then liberated with sodium hydroxide and taken up in ether, the ethereal solution is dried with potassium carbonate, evaporated, and the residue is distilled twice in a high vacuum, $B_{.0.0001}$ 95–96°. The 2-(p-methoxyphenyl)-5,6-dimethyl morpholine passes over at 95–96° under 0.0001 mm. pressure.

What we claim is:
1. 2-phenyl-3,4-dimethyl-5,6-tetramethylene - morpholine.
2. 2-phenyl-5,6-dimethyl-morpholine.
3. 2-phenyl-5,6-tetramethylene-morpholine.
4. 2-phenyl-3-methyl-5,6-tetramethylene-morpholine.
5. 2 - (p-hydroxy-phenyl)-4-methyl-5,6-tetramethylene-morpholine.
6. 2-(p-methoxy-phenyl)-5,6-dimethyl-morpholine.

References Cited in the file of this patent
UNITED STATES PATENTS

| | | |
|---|---|---|
| 2,835,669 | Thoma | May 20, 1958 |

FOREIGN PATENTS

| | | |
|---|---|---|
| 318,638 | Switzerland | Feb. 28, 1957 |
| 541,804 | Belgium | Oct. 31, 1955 |
| 791,416 | Great Britain | Mar. 5, 1958 |
| 1,174,413 | France | Nov. 3, 1958 |